United States Patent Office 3,326,962
Patented June 20, 1967

---

3,326,962
ETHYL(HYDROCARBYLOXYETHYL)
CARBAMATES
George E. Ham and Leonard Levine, Lake Jackson, Tex.,
assignors to The Dow Chemical Company, Midland,
Mich., a corporation of Delaware
No Drawing. Filed Nov. 20, 1963, Ser. No. 325,159
9 Claims. (Cl. 260—471)

This invention relates to carbamate compositions and to methods of preparing such compositions. More particularly, this invention relates to carbamates which contain an alkoxyalkyl group attached to the nitrogen atom of the carbamate and to the preparation of such carbamates by the reaction of an alkyl 1-aziridinylcarboxylate (including esters in which the aziridinyl group contains substituents in the 2 and 3 positions) and an alcohol in the presence of an acidic material.

It is known that thiophenol reacts with alkyl 1-aziridinylcarboxylates to produce alkyl 2-phenylthiocarbamates without a catalyst, as disclosed by Iwakura et al. in J. Org. Chem., 26, 4384–8 (1961). However, phenols did not react similarly in non-catalytic systems either at room or elevated temperatures.

It has now been found that alcohols will react with alkyl esters of substituted and unsubstituted 1-aziridinylcarboxylic acids in the presence of an acidic catalyst to produce the corresponding carbamate compound.

The reaction may be represented by the following equation:

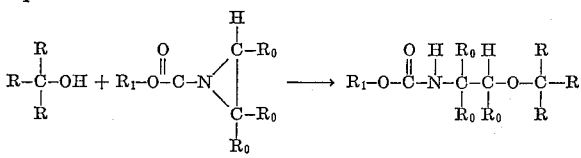

wherein each $R_0$ is independently selected from the group consisting of the hydrogen atom and a lower alkyl group of from 1 to 4 carbon atoms and each R may be a hydrogen atom, an alkyl group of from 1 to 11 carbon atoms or an aryl group of from 6 to 10 carbon atoms (such as phenyl, tolyl, cumyl, phenylethyl, naphthyl or duryl) and $R_1$ is a lower alkyl group of from 1 to 4 carbon atoms. Thus, each $R_0$ and $R_1$ may be a methyl, ethyl, n-propyl, i-propyl, n-butyl, sec.-butyl, tert.-butyl or i-butyl group and each R may be any of these groups plus a pentyl, hexyl, heptyl, octyl, nonyl, decyl or undecyl group.

As starting materials, alcohols such as methanol, ethanol, 2-propanol, n-butanol, t-butyl alcohol, isobutyl alcohol, 1-pentanol, hexanols, heptanols, octanols, decanols, undecanols, dodecanols (such as lauryl alcohol), benzyl alcohol, stearyl alcohol and 3-phenyl-1-propanol may be used. Suitable reactants include alcohols of up to 20 or 30 carbon atoms, such as alkanols of from 1 to 18 carbon atoms. Each of these alcohols may be reacted with alkyl 1-aziridinylcarboxylates such as methyl 2-methyl-1-aziridinylcarboxylate, ethyl 2,3-diethyl-1-azirdinylcarboxylate, ethyl 2-n-butyl-1-aziridinylcarboxylate, n-propyl 1-aziridinylcarboxylate, ethyl 2-n-propyl-1-aziridinylcarboxylate and t-butyl 1-aziridinylcarboxylate to produce the corresponding carbamate compound.

The acidic catalyst used in the process may be any Lewis acid (electron acceptor) which behaves as a proton, such as $BF_3$, $SnCl_4$, $BCl_3$, $ZnCl_2$, $AlCl_3$, etc., or a conventional acid material which produces a proton (or a solvated proton) such as $H_2SO_4$, HCl, HBr, $HNO_3$, etc. Only a catalytic amount of acidic material is required.

Generally from about 0.001 mole to .10 mole of acidic catalyst per mole of alkyl 1-aziridinylcarboxylate is sufficient. Non-volatile acidic materials are preferably employed as catalysts in the process.

The reaction may be carried out at temperatures of from about −80° C. to 200° C. (usually at from −80° C. to 100° C. and preferably at room temperature) using pressures of from .5 atmosphere to 2 or 3 atmospheres or autogenous pressures developed during the reaction. The amount of alcohol used in the reaction should be at least one mole of alcohol per mole of carboxylate group. If less than about 0.5 mole of alcohol per mole of carboxylate group is used, a smaller amount of carbamate is produced, since the limiting reactant is the alcohol when less than an equimolar ratio is used. Mole ratios of alcohol to carboxylate group of from 1:1 to 50:1 may be used, and ratios of from 2:1 to 20:1 are preferable. The process operates effectively when from 2 to 20 moles of alcohol per mole of carboxylate group are reacted in the presence of an amount of catalyst sufficient to provide from .005 to .01 mole of non-volatile acidic catalyst per mole of carboxylate group at room temperature under atmospheric or autogenous pressure.

The compounds of the invention are useful as bactericides in either concentrated or dilute solutions or dispersions. The compounds are especially effective for inhibiting or preventing the growth of E. coli. In addition, the compounds may be used as inhibitors and stabilizers for haloalkanes which deteriorate in the presence of aluminum metal. The compounds are good inhibitors when incorporated into such haloalkanes (for example, methyl chloroform) in amounts sufficient to give a concentration of up to about 15 percent (based on the total weight of the composition). Only an inhibiting amount of the compound is necessary and concentrations of from about 0.5 to 5 percent are ordinarily sufficient for methyl chloroform stabilization.

The following examples are submitted for the purpose of illustration only and are not to be construed as limiting the scope of the invention in any way.

*Example I.—General procedure*

Tto a stirred, refluxing solution (118° C.) of 60 grams (0.81 mole) of n-butanol and 0.45 gram of boron trifluoride etherate was added dropwise a solution of 17.6 grams (0.153 mole) of ethyl 1-aziridinylformate (ethyl 1-aziridinylcarboxylate) and 21 grams (0.28 mole) of n-butanol. The solution was diluted with diethyl ether, washed with saturated NaCl solution and finally dried over anhydrous calcium sulfate. The reaction mixture was filtered and the filtrate concentrated at reduced pressure. Vacuum distillation of this concentrate yielded 19.4 grams (67 percent of theory) of ethyl(2-butoxyethyl)-carbamate which distilled at 56°–59° C. at 0.1 mm. pressure, $\eta_D{}^{25}=1.4339$.

The infrared spectrum was consistent with the formula:

Hydrolysis of a sample of this product gave 2-butoxyethylamine [identified by preparation of the solid picrolonate (melting point 172° C.) by reaction with picrolonic acid].

*Examples II–IX*

In a similar manner, other alcohols were reacted using acidic catalysts. The results and compounds prepared are summarized in Table 1.

TABLE 1

| Example Number | Reactants and Proportions | | | Reaction Temp. (° C.) | Catalyst (grams, unless noted) | Product | Yield (percent of theory) | Boiling Point/ mm. Hg | $n_D^{\,\circ}$ C. |
|---|---|---|---|---|---|---|---|---|---|
| | Alcohol | Moles Alcohol | Moles EAF* | | | | | | |
| II | Methanol | 1.91 | 0.20 | 25 | Conc. (98 percent) $H_2SO_4$, 0.3 cc. | (A) | 81 | 65°–66°/1.0 | $1.4354^{20°}$ |
| III | Ethanol | 0.60 | 0.20 | 25 | 1.0 $BF_3 \cdot (CH_3CH_2)_2O$ | (B) | 61.8 | 92°/0.5 | $1.4335^{20°}$ |
| IV | 1-butanol | 0.844 | 0.20 | 25 | Conc. (98 percent) $H_2SO_4$, 0.5 cc. | (C) | 60 | 85°–90°/0.1 | $1.4384^{20°}$ |
| V | do | 0.80 | 0.153 | 89–90 (3.5 hours) | 0.35 $BF_3 \cdot (CH_3CH_2)_2O$ | (D) | 49 | | |
| VI | do | 0.80 | 0.153 | 118–121 (2.5 hours) | 0.45 $BF_3 \cdot (CH_3CH_2)_2O$ | (E) | 67 | | |
| VII | 2-butanol | 0.80 | 0.153 | 97–101 (4 hours) | 0.45 $BF_3 \cdot (CH_3CH_2)_2O$ | (F) | 55 | 61°–62°/0.3 | $1.4310^{27°}$ |
| VIII | 1-decanol | 0.72 | 0.153 | 117–120 (3 hours) | 0.45 $BF_3 \cdot (CH_3CH_2)_2O$ | (G) | 75 | 108°–110°/0.1 | $1.4439^{25°}$ |
| IX | Benzyl | 0.80 | 0.153 | 118–121 (3 hours) | 0.45 $BF_3 \cdot (CH_3CH_2)_2O$ | (H) | 56 | 98°–100°/0.1 | $1.5053^{25°}$ |

*EAF = Ethyl 1-aziridinylformate (ethyl 1-aziridinylcarboxylate).

(A) $CH_3CH_2O-\overset{O}{\overset{\|}{C}}-\overset{H}{\overset{|}{N}}-CH_2CH_2OCH_3$ (B) $CH_3CH_2O-\overset{O}{\overset{\|}{C}}-\overset{H}{\overset{|}{N}}-CH_2CH_2OCH_2CH_3$ (C) $CH_3CH_2O-\overset{O}{\overset{\|}{C}}-\overset{H}{\overset{|}{N}}-CH_2CH_2O(CH_2)_3CH_3$ (D) $CH_3CH_2O-\overset{O}{\overset{\|}{C}}-\overset{H}{\overset{|}{N}}-CH_2CH_2O(CH_2)_3CH_3$ (E) $CH_3CH_2O-\overset{O}{\overset{\|}{C}}-\overset{H}{\overset{|}{N}}-CH_2CH_2O(CH_2)_3CH_3$ (F) $CH_3CH_2O-\overset{O}{\overset{\|}{C}}-\overset{H}{\overset{|}{N}}-CH_2CH_2O-\overset{CH_3}{\underset{H}{\overset{|}{C}}}-CH_2CH_3$ (G) $CH_3CH_2O-\overset{O}{\overset{\|}{C}}-\overset{H}{\overset{|}{N}}-CH_2CH_2O-(CH_2)_9CH_3$ (H) 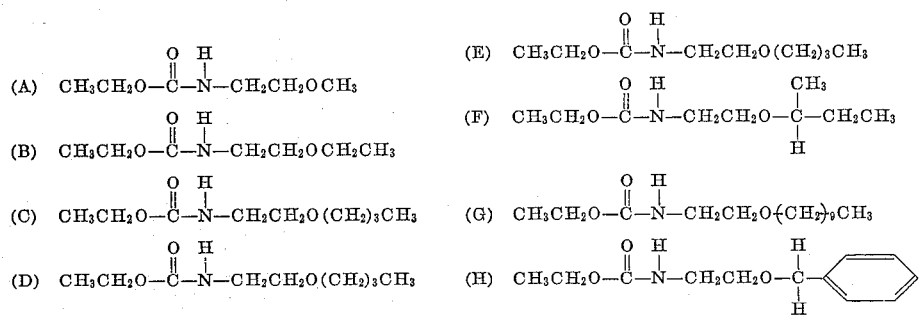

Example X

The carbamates prepared in the above examples were tested as bactericides by streaking the compounds in a nutrient agar which was cross-streaked with *E. coli*. *E. coli* did not grow at the place where a streak of the bacterial suspension crossed the streak of test compound. When the compounds of Examples IV, VII and VIII were incorporated at 4 percent (weight) concentration in methyl chloroform, good inhibition of the methyl chloroform against attack by aluminum metal was obtained.

We claim as our invention:

1. A compound of the formula $$R_1-O-\overset{O}{\overset{\|}{C}}-\overset{H}{\overset{|}{N}}-\overset{R_0}{\underset{R_0}{\overset{|}{C}}}-\overset{H}{\underset{R_0}{\overset{|}{C}}}-O-\overset{H}{\underset{H}{\overset{|}{C}}}-R$$

wherein:
(a) each $R_0$ is independently selected from the group consisting of a hydrogen atom and a lower alkyl group of from 1 to 4 carbon atoms,
(b) $R_1$ is a lower alkyl group of from 1 to 4 carbon atoms, and
(c) R is an aryl group of from 6 to 10 carbon atoms.

2. The compound:

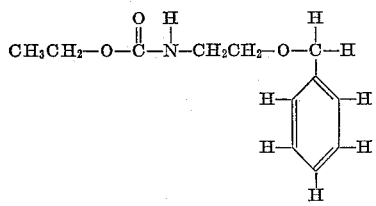

3. A process for preparing carbamates which comprises reacting an alcohol of the formula

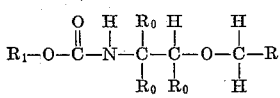

with an ester of the formula $$R_1-O-\overset{O}{\overset{\|}{C}}-N\begin{smallmatrix}\diagup \\ \diagdown\end{smallmatrix}\begin{matrix}\overset{H}{\overset{|}{C}}-R_0 \\ \overset{|}{C}-R_0 \\ \overset{|}{R_0}\end{matrix}$$

wherein:
(a) each $R_0$ is independently selected from the group consisting of a hydrogen atom and a lower alkyl group of from 1 to 4 carbon atoms,
(b) $R_1$ is a lower alkyl group of from 1 to 4 carbon atoms, and
(c) each R is selected from the group consisting of the hydrogen atom, an aryl group of from 6 to 10 carbon atoms and an alkyl group of from 1 to 11 carbon atoms in the presence of an acidic catalyst selected from the group consisting of a Lewis acid, $H_2SO_4$, HCl, HBr and $HNO_3$ 4. The process of claim 3 wherein the ester and alcohol are reacted at temperatures of from −80° C. to 100° C.

5. The process of claim 4 wherein the acidic catalyst is a Lewis acid.

6. A process for the preparation of a carbamate which comprises reacting an alkanol of from 1 to 18 carbon atoms with an ester of the formula $$R_1-O-\overset{O}{\overset{\|}{C}}-N\begin{smallmatrix}\diagup \\ \diagdown\end{smallmatrix}\begin{matrix}\overset{H}{\overset{|}{C}}-H \\ \overset{|}{C}-H \\ \overset{|}{H}\end{matrix}$$

wherein $R_1$ is a lower alkyl group of from 1 to 4 carbon atoms, in the presence of an acidic catalyst selected from the group consisting of a Lewis acid, $H_2SO_4$, HCl, HBr and $HNO_3$.

7. The process of claim 6 wherein the reaction is carried out at temperatures of from −80° C. to 100° C. and wherein the acidic catalyst is a Lewis acid.

8. The process of claim 6 wherein the reaction is carried out at temperatures of from −80° C. to 100° C. and wherein the acidic catalyst is selected from the group consisting of $H_2SO_4$, HCl, HBr, and $HNO_3$.

9. A process for preparing ethyl 2-butoxyethylcarbamate which comprises reacting stoichiometric amounts of n-butanol and ethyl 1-aziridinylcarboxylate in the presence of a member selected from the group consisting of $BF_3$ and $H_2SO_4$.

References Cited

Iwakura et al., J. Org. Chem. 26, 4384–8 (1961).
Lucas, Chem. Abs., 56, 3531h (1962).

LORRAINE A. WEINBERGER, *Primary Examiner.*

DANIEL D. HORWITZ, *Examiner.*